(12) United States Patent
Kudo

(10) Patent No.: US 8,325,363 B2
(45) Date of Patent: Dec. 4, 2012

(54) PRINTER WITH FUNCTION TO CANCEL PRINTING

(75) Inventor: Yasuhiro Kudo, Ichinomiya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 840 days.

(21) Appl. No.: 12/363,125

(22) Filed: Jan. 30, 2009

(65) Prior Publication Data

US 2009/0195825 A1    Aug. 6, 2009

(30) Foreign Application Priority Data

Feb. 1, 2008   (JP) ................................. 2008-023151

(51) Int. Cl.
*G06F 3/12* (2006.01)
(52) U.S. Cl. ...................................... 358/1.15
(58) Field of Classification Search .................. None
See application file for complete search history.

(56) References Cited

U.S. PATENT DOCUMENTS

| | | | |
|---|---|---|---|
| 7,158,243 B2 * | 1/2007 | Sakamoto et al. | 358/1.1 |
| 2001/0019426 A1 * | 9/2001 | Funahashi | 358/1.16 |
| 2002/0143915 A1 | 10/2002 | Mathieson | |
| 2002/0186400 A1 | 12/2002 | Matsueda | |
| 2004/0141202 A1 * | 7/2004 | Okigami | 358/1.15 |
| 2006/0061797 A1 * | 3/2006 | Kondo | 358/1.14 |

FOREIGN PATENT DOCUMENTS

| | | |
|---|---|---|
| JP | 11-143665 | 5/1999 |
| JP | 2003-303060 | 10/2003 |
| JP | 2006-155621 | 6/2006 |

OTHER PUBLICATIONS

English Abstract of JP 2003-303060, published Oct. 24, 2003, "Printing System, Printer, Printer Host and Printer Driver," serving as the Concise Statement of the relevance of JP 2003-303060.
English Abstract of JP 2006-155621, published Jun. 15, 2006, Computer System, Computer Processing Method and Computer-Readable Recording Medium, serving as the Concise Statement of the relevance of JP 2006-155621.
European Search Report dated Jun. 5, 2009, European Patent Appl. No. 09250235.0.
English Abstract of JP 11-143665, published May 28, 1999, "System for Controlling Printing and Its Method," serving as the Concise Statement of the relevance of JP 11-143665.

(Continued)

*Primary Examiner* — Twyler Haskins
*Assistant Examiner* — Barbara Reinier
(74) *Attorney, Agent, or Firm* — Vierra Magen Marcus & DeNiro LLP

(57) ABSTRACT

A printer is provided with a receiving device, a storage device, a printing device, a cancel input device and an invalidating device. The receiving device is configured to receive a print command. The storage device is configured to store an association of print data and a print command receiving time at which the print command has been received by the receiving device. The printing device is configured to print the print data. The cancel input device is configured to input a cancel command. The invalidating device is configured to invalidate printing of the print data associated with the print command receiving time that is earlier than a cancel input time at which the cancel command has been input.

21 Claims, 9 Drawing Sheets

OTHER PUBLICATIONS

English Translation of Japanese Patent Application publication No. JP 11-143665, published May 28, 1999, "System for Controlling Printing and Its Method," (Machine translation prepared by JPO).
Chinese Office Action mailed Apr. 30, 2010, Chinese Patent Appl. No. 200910003761.1.

English Translation of Chinese Office Action mailed Apr. 30, 2010, Chinese Patent Appl. No. 200910003761.1.
European Office Action dated Jun. 12, 2012, European Patent Application No. EP09250235.0.

* cited by examiner

FIG. 5

```
POST /upnp-print HTTP/1.1
Host: 192.168.1.1:80
Content-Length: 718
Content-Type: text/xml; charset="utf-8"
Date: Mon, 10 Dec 2007 10:01:00 GMT <soap:Envelope>
 <soap:Body>
  <CreateURIJob>                              — Print Command 70
   <JobName>Test Print</JobName>
   <JobOriginatingUserName>Test User</JobOriginatingUserName>
   <DocumentFormat>application/xhtml-print</DocumentFormat>
   <Copies>1</Copies>
   <Sides>one-sided</Sides>
   <NumberUp>1</NumberUp>
   <OrientationRequested>portrait</OrientationRequested>
   <MediaSize>iso_a4_210x297mm</MediaSize>
   <MediaType>stationery</MediaType>
   <PrintQuality>normal</PrintQuality>
   <CriticalAttributesList>none</CriticalAttributesList>
   <SourceURI>http://192.168.1.11:1025/a045f2e1.xhtml</SourceURI>
   <DateTimeAtCreation>Mon, 10 Dec 2007 10:00:30 GMT</DateTimeAtCreation>
  </CreateURIJob>
 </soap:Body>
</soap:Envelope>
```

PRINTER WITH FUNCTION TO CANCEL PRINTING

CROSS-REFERENCE TO RELATED APPLICATION

This application claims priority to Japanese Patent Application No. 2008-023151, filed on Feb. 1, 2008, the contents of which are hereby incorporated by reference into the present application.

BACKGROUND OF THE INVENTION

1. Field of the Invention

The present invention relates to a printer that is provided with a function to cancel printing.

2. Description of the Prior Art

A printer having a function to cancel printing is known. In Japanese patent application publication No. 2003-303060, an example of such type of conventional printer is disclosed. This printer is provided with an input device to input cancel command. For example, a user may recognize a mistake after having ordered print, and desires to cancel the ordered printing. In such a case, the user may utilize the input device to input the cancel command. Upon the input of the cancel command, the printer cancels the print job that is in print process.

BRIEF SUMMARY OF THE INVENTION

In a case where the cancel command is input to a printer in which a plurality of print jobs has been accumulated, the cancel command cannot be distinguished as to which print job the command was intended for. In such a circumstance, a new print command may be received while the cancel process is being carried out, and the print job in accordance with this new print command may as well be cancelled. In another words, in the conventional printer, there may be a possibility that a cancel process which the user does not desire may take place. The teachings disclosed in the present specification provides a printer that is capable of preventing such occurrence of undesired cancellation of printing The printer taught in the present specification may comprise a receiving device, a storage device, a printing device, a cancel input device and an invalidating device. The receiving device is configured to receive a print command. The receiving device may receive the print command that is sent from an external apparatus that is connected with the printer in a communicable manner. The print command may or may not include print data (i.e. data that is the object of printing). In the latter case, the print command may include an address at which the print data is stored. In this case, the printer may download the print data from the address included in the print command, and print the downloaded data.

The storage device is configured to store an association of print data and a print command receiving time at which the print command has been received by the receiving device. As mentioned above, the print command may include the print data, or may include the address of the print data instead of the print data. In the former case, the storage device may store the association of the print data and the print command receiving time. In the latter case, the storage device may store the association of the downloaded print data and the print command receiving time. Furthermore in the latter case, the storage may store the association of the address of the print data and the print command receiving time. All of the aforementioned cases are included in the term of "storing an association of print data and a print command receiving time." The "print command receiving time" may be the actual time at which the print command was received by the receiving device, or may be the time determined in accordance with a time received with the print command as will be described later in detail. Moreover, the aforementioned "actual time at which the print command was received by the receiving device" may be a time at which the command was received by the printer, or may be a time at which the command was received by a network adapter that connects the printer to a network.

The printing device is configured to print the print data. The printing device may print the print data included in the print command. Alternately, the printing device may download the print data from the address included in the print command, and print the downloaded data. "Print data" refers to data required for performing print, and is not limited to a particular format. For example, the print data may be vector data, or bit map data. The printing device may be configured to perform print preparation processes such as creating bit map data from the vector data. Furthermore, the printer driver may be installed in the external apparatus, or in the printer.

The cancel input device is configured to input a cancel command. The cancel command may be input to the cancel device in accordance with the operation by a user. In the other hand, the user may perform cancelling operation in the external apparatus, and the cancel command may be sent to the printer therefrom. In this case, the cancel input device may input the cancel command that has been sent from the external device.

The invalidating device is configured to invalidate printing of the print data associated with the print command receiving time that is earlier than a cancel input time at which the cancel command has been input. The term "invalidate" herein means to prohibit the printing device from printing the print data. This may also be expressed as that in the state of being invalidated, the print data is prohibited from being printed in the printing device.

In the printer disclosed in the present specification, the print command receiving time that corresponds to the print command is stored in the storage device. Hence, the invalidating device is capable of referring to the print command receiving time when the cancel input time is obtained (i.e. when the cancel command is input to the printer), and exclusively invalidate printing of print data with the print command receiving time earlier than the cancel input time. According to the aforementioned configuration, undesirable conditions in which printing that had been instructed after the input time of the cancel command is invalidated do not happen. With the employment of the aforementioned configuration, occurrence of cancellation of printing that is not intended by the user is prevented.

The present specification may also disclose a printer as below. The printer may comprise a printing device, a first task performing device, a second task performing device, a storage device, a cancel input device and an invalidating device. The printing device is configured to print a print data. The first task performing device is configured to send print data. The second task performing device is configured to receive the print data sent from the first task performing device, create an association of the print data and a print data receiving time at which the print data has been received, and perform a process to have the print data printed in the printing device. The storage device is configured to store the association created by the second task performing device. The cancel input device is configured to input a cancel command. The invalidating device is configured to invalidate printing of the print data associated with the print data receiving time that is earlier than a cancel input time at which the cancel command has been input.

BRIEF DESCRIPTION OF THE DRAWINGS

FIG. 5 shows an example of a print command received by the printer.

DETAILED DESCRIPTION OF THE INVENTION

The embodiment will be described with reference to the figures. In the explanation below, the text data and image data for which printing is instructed by a print command that is sent from an external apparatus to a printer are referred to as a "print data." Furthermore, the series of processes that are carried out on the print data in order to perform printing in accordance with a single print command sent from the external apparatus is referred to as a "job." The respective process performed by each of the processors as will be described later is referred to as a "task."

Figure 1:
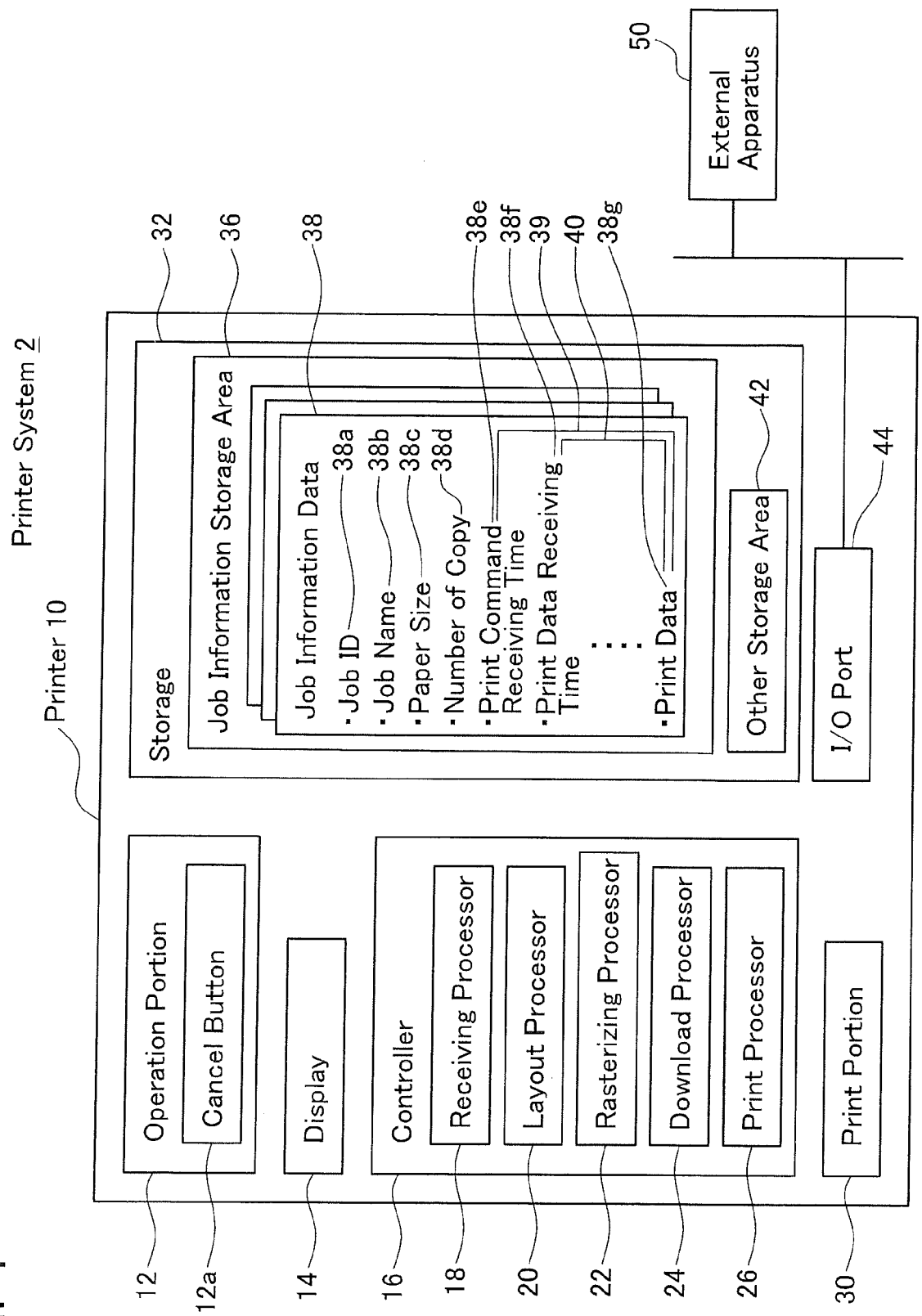
FIG. 1 shows a schematic configuration of an external apparatus and a printer.

FIG. 1 shows a printer system 2 of the present embodiment. The printer system 2 comprises a printer 10 and an external apparatus 50. The external apparatus 50 is a device that is configured to send print command that instructs the printer 10 to perform printing. For example, one of the personal computers, digital cameras, television devices and DVD recorders may be employed as the external apparatus 50.

(Configuration of the Printer)

The printer 10 comprises an operation portion 12, a display 14, a controller 16, a print portion 30, a storage 32, an input/output interface (I/O interface) 44, and the like. The operation portion 12 is composed of a plurality of keys. The user can input information or commands to the printer 10 by operating the operation portion 12. The operation portion 12 includes a cancel button 12a. The user can operate the cancel button 12a and selectively input one of a plurality of kinds of cancel commands. The variation of the cancel command that can be input to the printer 10 will be described later in detail. The display portion 14 is capable of displaying information.

The controller 16 is composed of CPU and the like. The controller 16 is capable of executing a plurality of tasks in parallel (as in simultaneously). The controller 16 may be composed of one CPU, or may be composed of a plurality of CPUs. In either configuration, the controller is capable of performing tasks in parallel. The controller 16 comprises a receiving processor 18, a layout processor 20, rasterizing processor 22, a download processor 24 and a print processor 26. Respective processors 18-26 performs the task assigned thereto, and as a whole is able to perform the plurality of tasks in parallel. The contents of the tasks performed by the processors 18-26 will be described in detail later.

The print portion 30 is capable of printing onto a print medium in accordance with the bit map data created by the rasterizing processor 22 of the controller 16. The print portion 30 performs printing under the instructions given thereto from the print processor 26 of the controller 16. The storage 32 is composed of ROM, EEPROM, RAM, etc. The storage 32 comprises a job information storage area 36. The job information storage area 36 is capable of storing a plurality of job information data. The job information data is created in accordance with the print command. The contents described in the job information data will be described in detail later. Moreover, the storage 32 further comprises a storage area 42 that stores programs to be executed by the controller 16 to perform tasks, data received from the external apparatus or the like, data generated by the controller 16, and the like. The I/O port 44 is connected with LAN network and the Internet. The printer 10 is capable of communicating with the external apparatus 50 and other devices on the networks via the I/O port 44.

(Cancel Storing Process)

Figure 2:
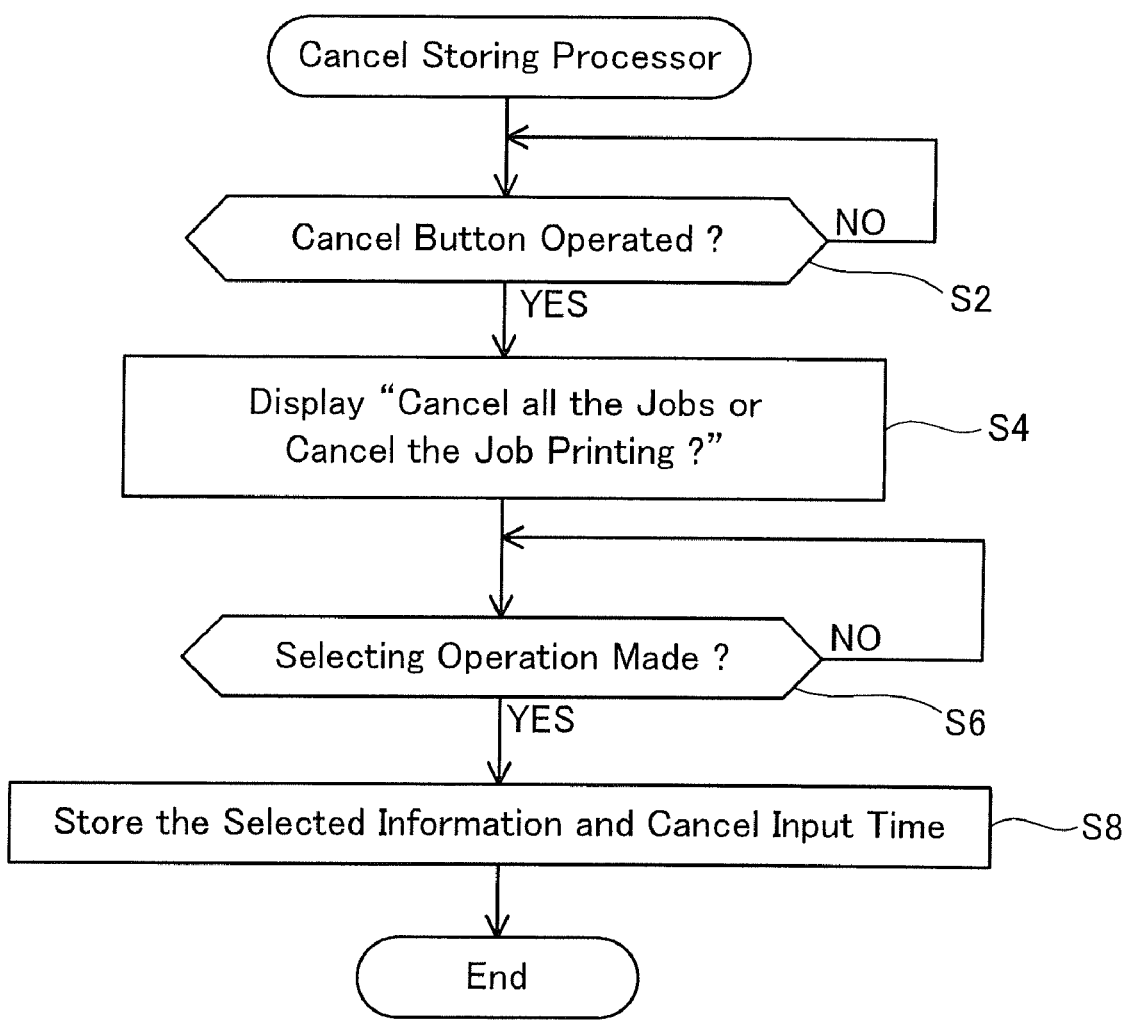
FIG. 2 is a flowchart of cancel storing process.

The cancel storing process executed by the controller 16 will be described below. Specifically, this process is performed by a processor (not shown in the figures) other than the processors 18-26 that is comprised by the controller 16. FIG. 2 is the flowchart of the cancel storing process. As mentioned above, the user can operate the cancel button 12a. In such a case, the controller 16 determines YES in S2 and performs display process (S4). Specifically, the controller 16 displays the selection of "cancel all the jobs or cancel the job printing?" on the display 14. The user may select one of the cancellation method by operating the buttons on the operation portion 12. In such a case, the controller 16 determines YES in S6 and stores the selected method (one of "cancel all the jobs" and "cancel the job printing") and a cancel input time in the storage area 42 (S8). The cancel input time may be the time at which the cancel button 12a was operated in S2, or may be the time at which the selection was made in S6.

The processes (tasks) performed by the processors 18-26 of the controller 16 will be described below.

(Receiving Process)

Figure 3:
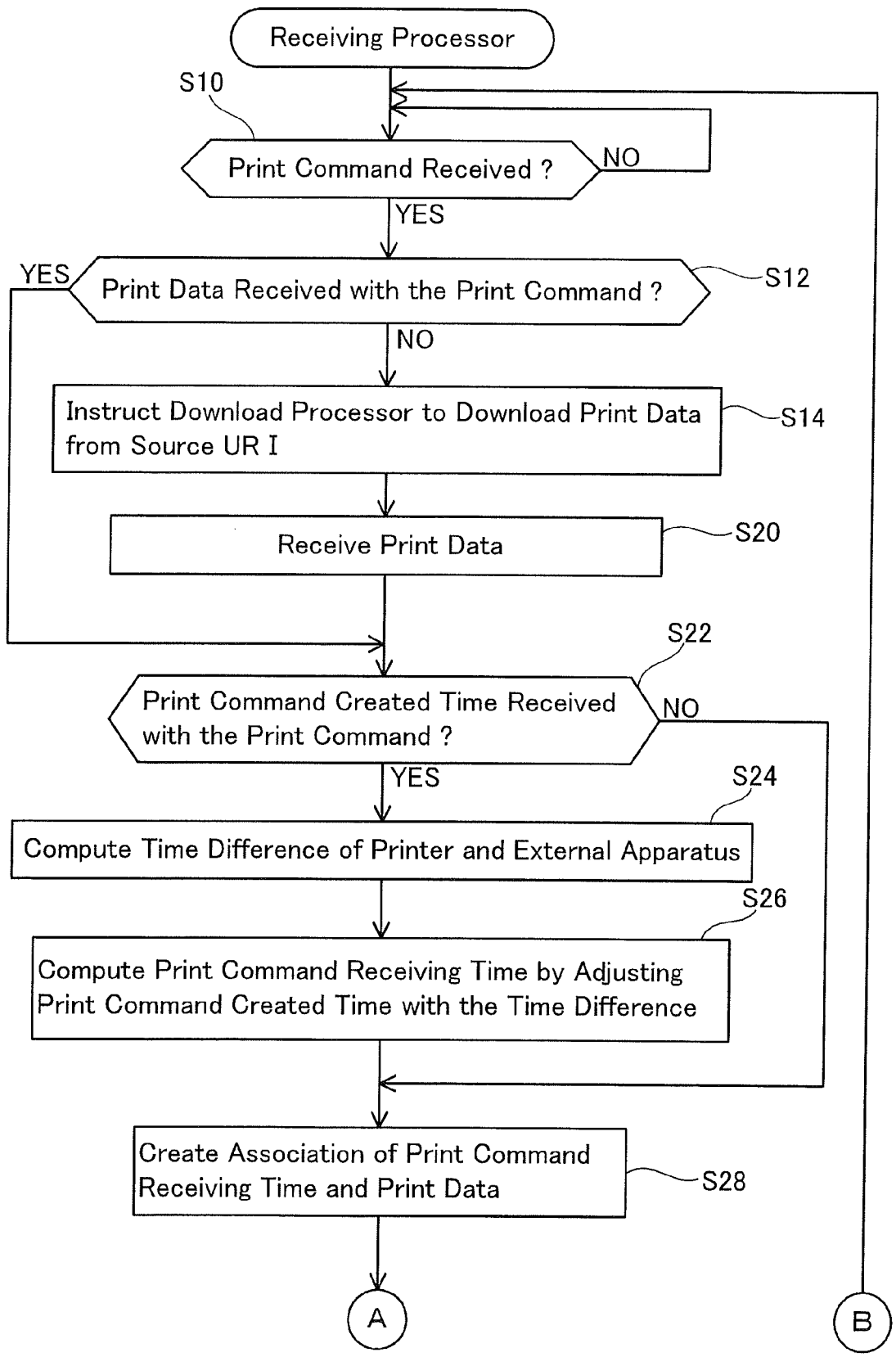
FIG. 3 is a flowchart of receiving process.
Figure 4:
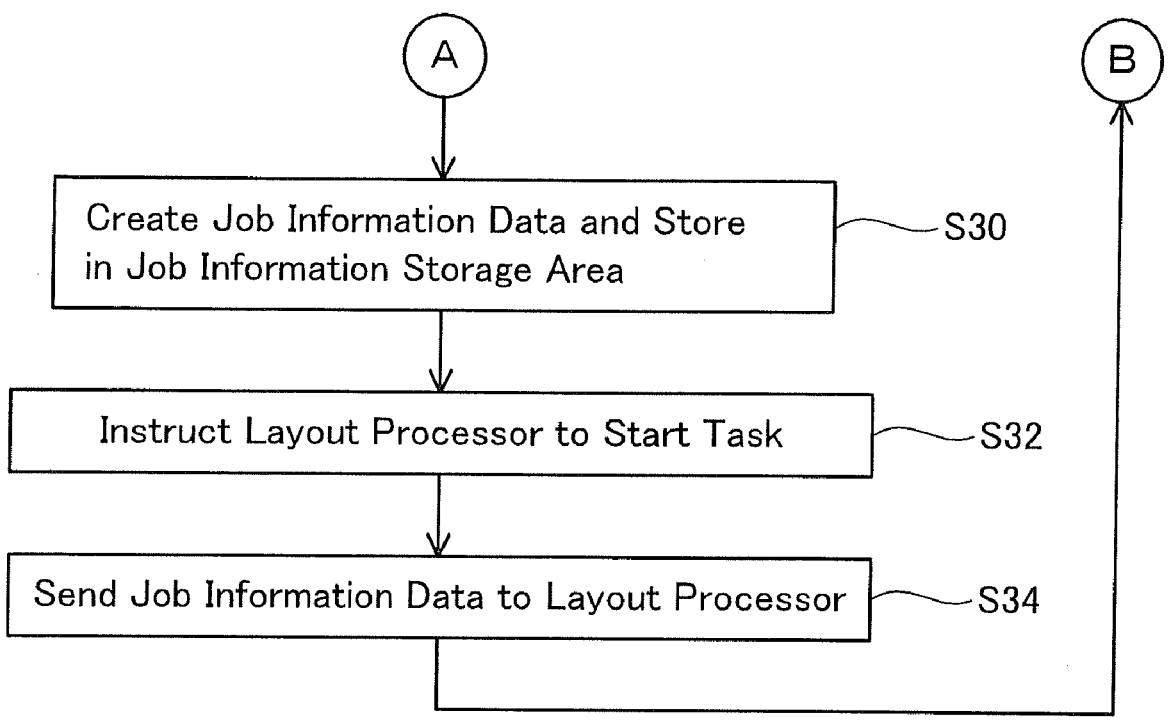
FIG. 4 is a continuing flowchart of the receiving process.

FIGS. 3 and 4 are the flowchart of the receiving process. The receiving process is performed by the receiving processor 18 of the controller 16. The receiving processor 18 monitors whether a print command from external apparatus 50 (or any other apparatuses) is received (S10). As mentioned above, the external apparatus 50 of FIG. 1 is capable of sending data to instruct print to the printer 10. In the data transmitted from the external device 50 and received by the printer 10 via the I/O port 44, a command (print command) to instruct print is included. In such a case, YES is determined in S10. FIG. 5 shows an example of the data 62 received by the printer 10. In data 62 of the present embodiment, in addition to the print command 70, an address 71 at where the print data is stored, number of copy, print formats and the like are included. Moreover, the data 62 includes information 72 that relates to the time at which the print command 70 was created (hereinafter referred to as "print command created time 72"). It should be noted that, in other embodiments, the data 62 may alternately not include the print command created time 72 (that is, print command created time may not be received together with the print command). Whether the print command created time is included with the print command may depend on the functions that the 'sender' external device comprises. Furthermore, data 62 includes information 60 that relates to the time at which the print command 70 was sent from the external device 50 (hereinafter referred to as "print command dispatch time 60").

The receiving processor 18 then determines whether print data has been received with the print command that had been received in S10 (S12). In case where the print data had been received with the print command (YES at S12), the process proceeds to S22. On the other hand, in case where the print data had not been received with the print command (NO at S12), the receiving processor 18 instructs the download processor 24 to download the print data from the source URI (Uniform Resource Identifier) that is designated with the print command (S14). The source URI is the address of the data that is necessary for performing printing (e.g. XHTML-Print data). For example, in the case of the data 62 in FIG. 5, no print data is included therein; and the source URI 71 that designates the address of the storage location of the print data is included instead. The source URI 71 includes the IP address and port number of the apparatus that stores the print data (in the present embodiment, the external apparatus 50 in FIG. 1), and the file name of the print data. In FIG. 5, "192.168.1.11" is the IP address, "1025" is the port number and "a045f2e1.xhtml" is the file name of the XHTML-Print data. The XHTML-Print data will hereinafter be referred simply as "XHTML data."

After the print data is downloaded by the download processor 24, the downloaded print data is sent to the receiving processor 18 and thereby received (S20). The details of the process carried out by the download processor 24 will be described later.

The receiving processor 18 then determines whether the print command created time has been received with the print command in S10 (S22). In the case of the print command 70 of FIG. 5, the print command created time 72 is received therewith. In such a case, YES is determined at S22, and proceeds to S24. On the other hand, in a case where the print command created time had not been received with the print command, NO is determined in S22 and proceeds to S28. In S24, the time difference between the printer 10 and the external apparatus 50 is computed from the dispatch time at which the print command had been dispatched from the external apparatus 50 and the receipt time at which the print command had been received by the printer 10. As mentioned above, the print command dispatch time 60 is appended to the print command 70. Based on this time information and the time at which the print command had been received by the receiving processor 18, the time difference can be calculated. For example, in a case where the receipt time is "10:03:00", the time difference between the aforesaid receipt time and the print command dispatch time 60 of FIG. 5 is computed to be "plus two minutes." The computed time difference is stored in the storage 32 in this step. In the present embodiment, the time difference is computed each time the print command created time is received with the print command, however, the embodiment of the teachings disclosed herein is not limited to that specific configuration. For example, the process of S24 may be performed when the initial communication (transmission of data) is made between the printer 10 and the external apparatus 50, e.g. when the power of the printer 10 or the external apparatus 50 had been turned ON, and the time difference may be calculated at that time prior to the transmission of the print commands.

When having had the time difference calculated, the receiving processor 18 computes the print command receiving time by adjusting the print command created time with the calculated time difference (S26). For example, in the case of the print command created time 72 of FIG. 5, the print command created time of "10:00:30" is adjusted by the aforementioned time difference "plus two minutes", and the print command receiving time of "10:02:30" is calculated. In the present embodiment, the print command created time that had been corrected with the time difference between the printer 10 and the external apparatus 50 is utilized as the print command receiving time, however, the embodiment of the teachings disclosed herein is not limited to that specific configuration. For example, the print command receiving time computed in S26 may be the print command dispatch time 60 that had been adjusted by the time difference that had predeterminedly been computed.

Next in S28, an association of the print command receiving time and the print data is created. In the case of the print command 70 being received with the print command created time 72, association data of the association of print command receiving time "10:02:30" created based on the adjusted print command created time 72 and print data downloaded from the external apparatus 50 is created. On the other hand, in the case where the print command does not accompany print command created time (in the case of NO at S22), the receipt time at which the print command had been received by the printer through the I/O port 44 is regarded as the print command receiving time, and an association of such print command receiving time and the print data is created in S28. The association data created in S28 is stored in the printer 10 in the oncoming process of S30 as being part of the job information data.

When having had the association created, the receiving processor 18 creates the job information data and stores it in the job information storage area 36 of the storage 32 (S30). The job information data is created herein based on the data received in S10 and the data created in the process of S12-S28. In the case of the job information data 38 shown in FIG. 1, it includes data such as the job ID 38a, job name 38b, paper size 38c, number of copy 38d, print command receiving time 38e, print data 38g (XHTML data at the current state) and the like that are necessary for performing printing. Furthermore, the job information data 38 may be said as including the association data 39 of the print command receiving time 38e and the print data 38g. Moreover, as shown in FIG. 1, the job information data 38 may include print data receiving time 38f. However, at the present step of S30, the print data receiving time 38f is yet to be included. The details thereof will be described later.

After having completed the series of aforementioned processes, the receiving processor 18 sends information to start a task (hereinafter referred to as "task-start command") to the layout processor 20 (S32). Then, the receiving processor 18 sends the job information data created in S30 to the layout processor 20 (S34). After the completion of the aforementioned processes, the receiving processor 18 returns to the state of monitoring the receipt of the next print command.

(Layout Process)

Figure 6:
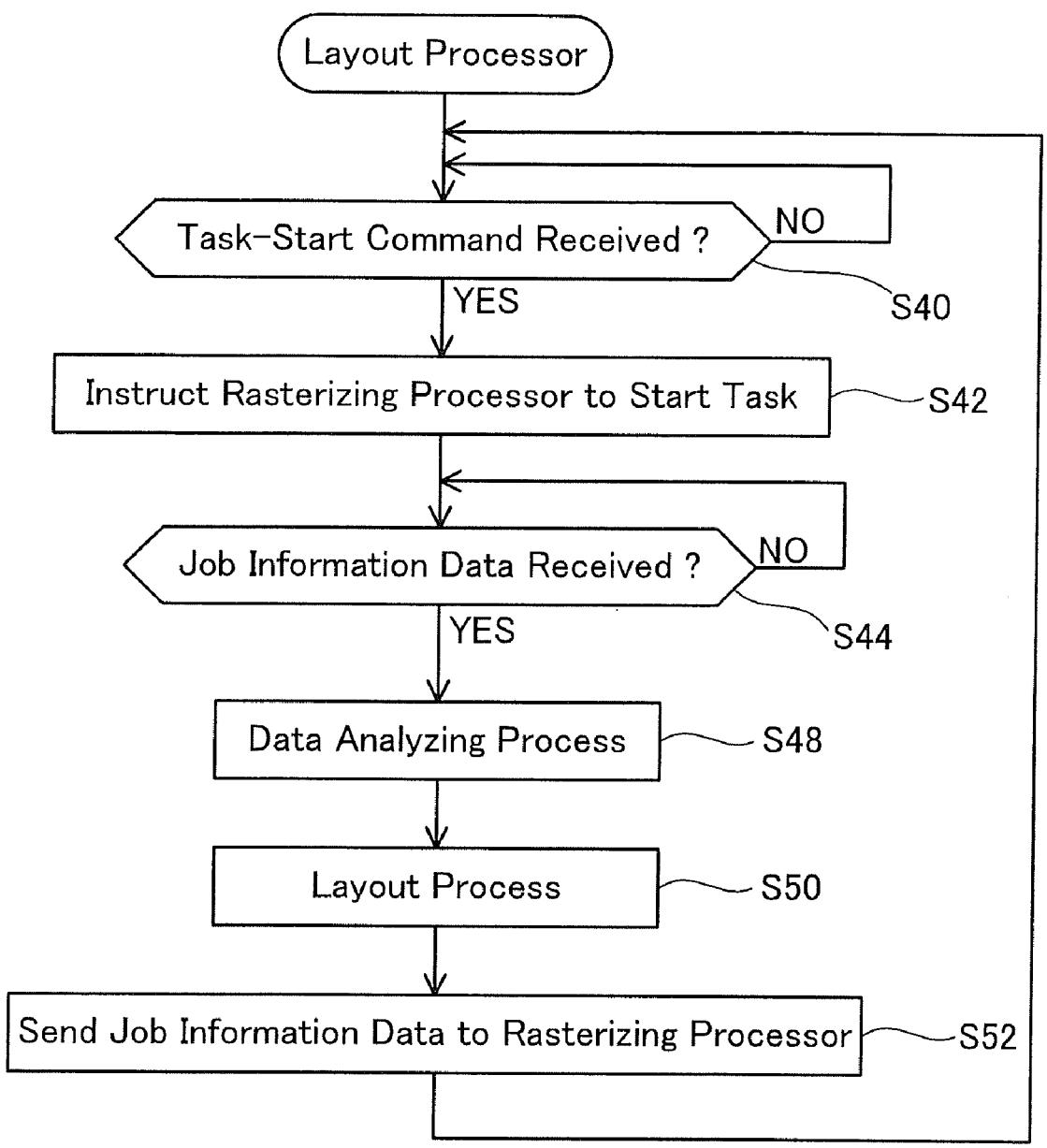
FIG. 6 is a flowchart of layout process.

FIG. 6 is the flowchart of the layout process. The layout process is performed by the layout processor 20 of the controller 16. The layout processor 20 monitors the receipt of task-start command (S40). The task-start command is sent from the receiving processor 18 to the layout processor 20 in S30 of FIG. 4. In the case of YES in S40, the layout processor 20 sends a task-start command to the rasterizing processor 22 (S42). Then, the layout processor 20 monitors the receipt of the job information data that is sent from the receiving processor 18 (S44). The job information data is sent from the receiving processor 18 to the layout processor 20 in S34 of FIG. 4. In the case of YES in S44, the process proceeds to S48.

In S48, the layout processor 20 performs data analyzing process. For example, the layout processor 20 may analyze the received XHTML data (i.e. print data) and create data in which the file names of a plurality of image data are tree-structured in the memory (storage area 42). Then in S50, the layout processor 20 performs layout process. For example, in a case where an URL of a style sheet is included in the data received in S44, the layout processor 20 instructs the download processor 24 to download the style sheet file designated by the URL. The style sheet file may include data for specifying the position of the respective image data of which had been obtained by analyzing the print data, data for specifying the rotation angle of the respective image data and the like. In this step, the layout processor 20 analyzes the style sheet file, and determines the layout (the coordinates upon which the respective data are to be arranged) of the respective image data. It should be noted that data that enables determination of the layout without downloading external files may alternately be included in the print data. In this case, the layout processor 20 determines the layout based on the data relating to layouts that area described in the print data. The layout of the image data to be printed is determined by the execution of S50, and the layout data is additionally appended to the print data included in the job information data.

The layout processor 20 then sends the job information data that includes the print data to which the layout data has been appended to the rasterizing processor 22 (S52). After completion of S52, the layout processor 20 returns to S40 and monitors the further receipt of another task-start command from the receiving processor 18.

(Rasterizing Process)

Figure 7:
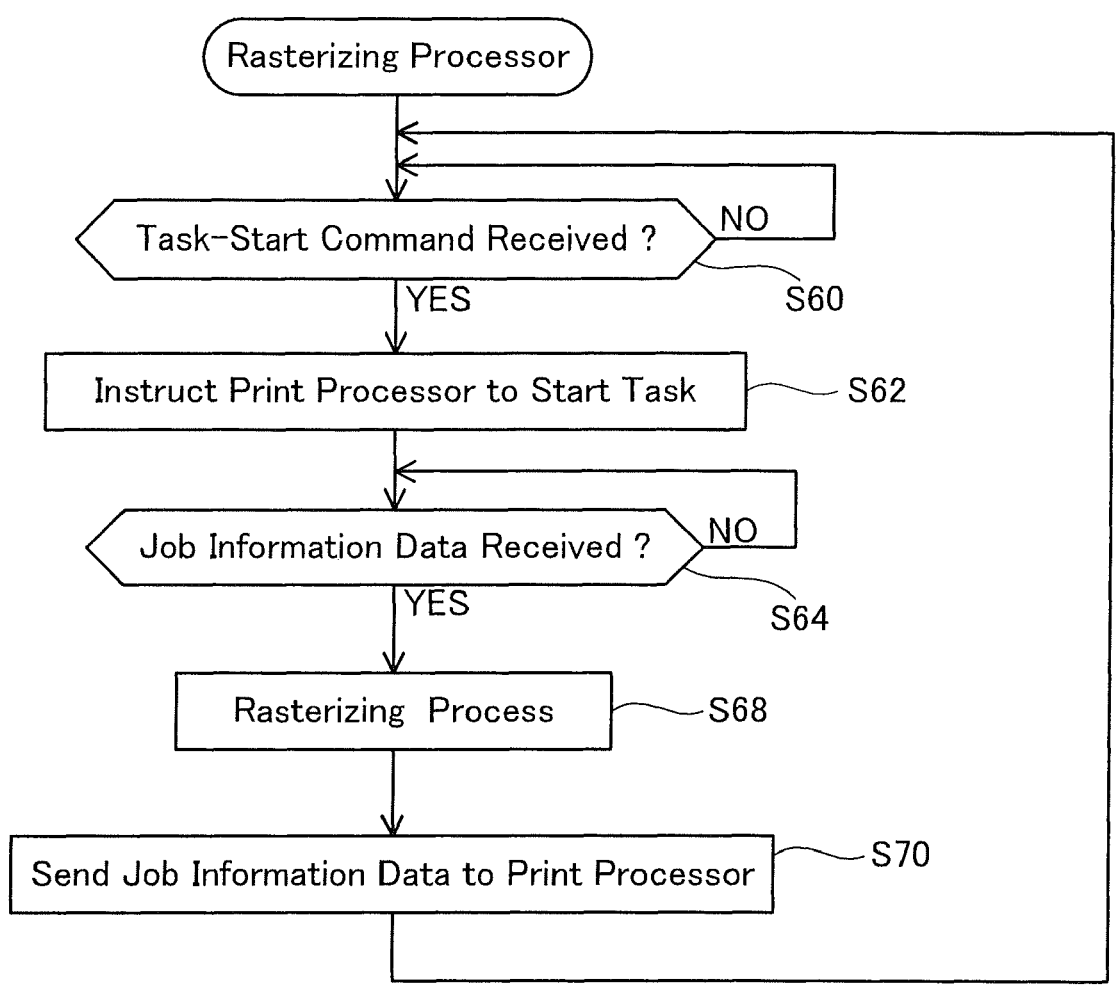
FIG. 7 is a flowchart of rasterizing process.

FIG. 7 is the flowchart of the rasterizing process. The rasterizing process is performed by the rasterizing processor 22 of the controller 16. The rasterizing processor 22 monitors the receipt of task-start command (S60). The task-start command is sent from the layout processor 20 to the rasterizing processor 22 in S42 of FIG. 6. In the case of YES in S60, the rasterizing processor 22 sends a task-start command to the print processor 26 (S62). Then, the rasterizing processor 22 monitors the receipt of the job information data that is sent from the layout processor 20 (S64). The job information data is sent from the layout processor 20 to the rasterizing processor 22 in S52 of FIG. 6. In the case of YES in S64, the process proceeds to S68.

It should be noted that the rasterizing processor 22 may determine YES in S64 when one of a plurality of page data (or image data) included in the print data of the job information data has been received. Alternately, the rasterizing processor 22 may determine YES in S64 when the entire contents of the print data of the job information data has been received. In the case of making determination YES in S64 when page data equivalent to one page has been received, the process from S68 and on will be repeated several times before the whole rasterizing process is completed.

In S68, the rasterizing processor 22 analyzes the print data, and performs process to rasterize the data included in the print data. The bit map data of the print data is thereby created. For example, in the case where URL of the image data is included in the print data received in S64, the rasterizing processor 22 instructs the download processor 24 to download the designated data (image data file) from the URL, analyze the downloaded file, and rasterize the image data included in the file. When the rasterizing process is performed, the rasterizing processor 22 sends the job information data that includes print data that has been rasterized (i.e. XHTML data and the image data) to the print processor 26 (S70).

(Printing Process)

Figure 8:
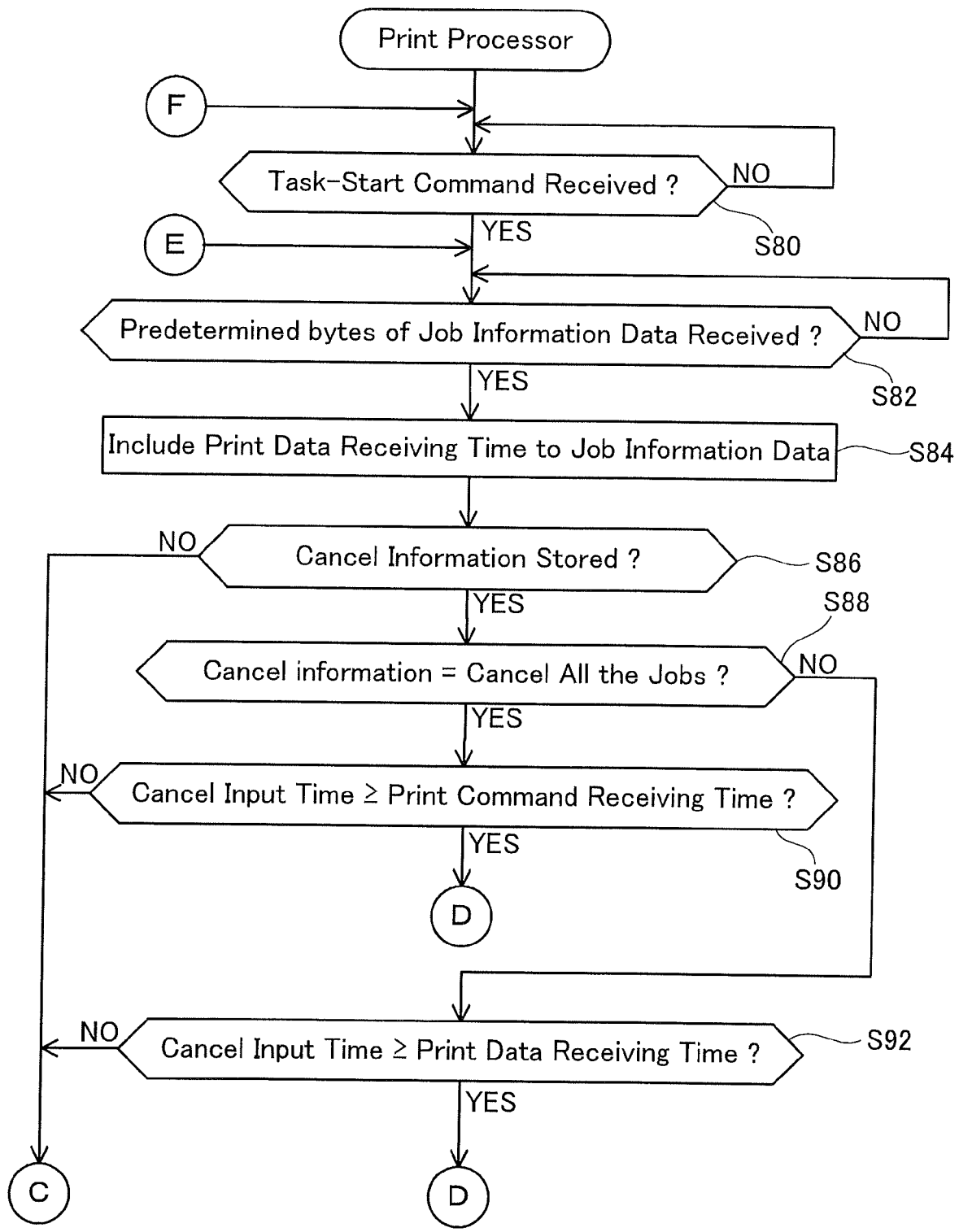
FIG. 8 is a flowchart of printing process.
Figure 9:
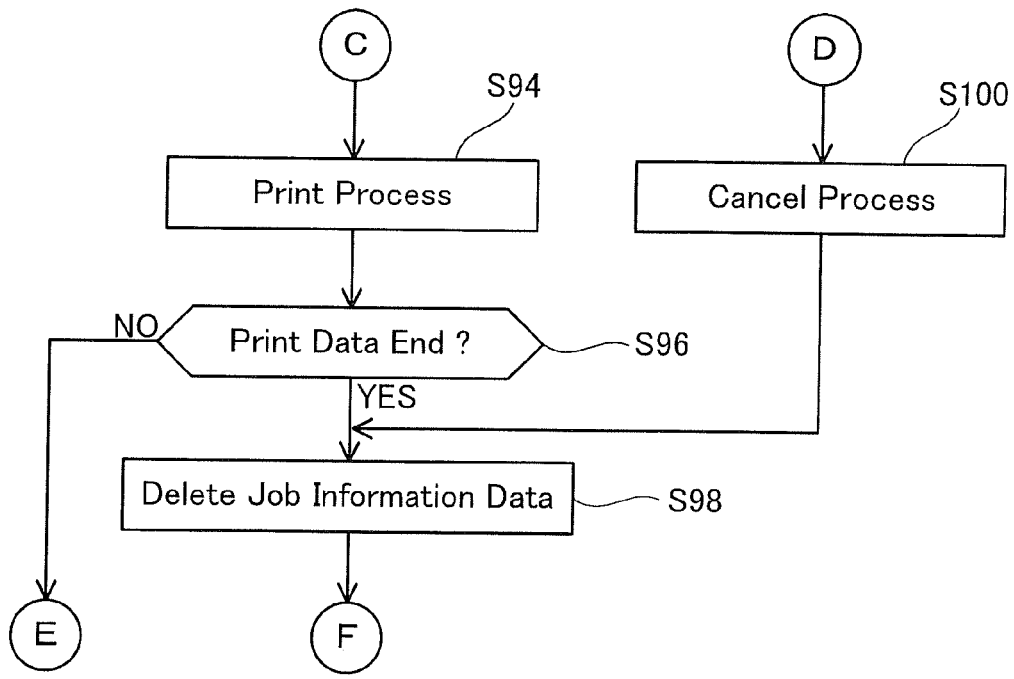
FIG. 9 is a continuing flowchart of the printing process.

FIGS. 8 and 9 are the flowchart of the printing process. The printing process is performed by the print processor 26 of the controller 16. Specifically, the printing process is performed by the print processor 26 and the print portion 30 under the instructions given thereto from the print processor 26. The print processor 26 monitors the receipt of task-start command (S80). The task-start command is sent from the rasterizing processor 22 to the print processor 26 in S62 of FIG. 7. After task start has been instructed in the aforementioned step, the print processor 26 may instruct print preparation process such as transferring print medium stored in a paper tray along a transfer path and the like. In the case of YES in S80, the print processor 26 monitors the receipt of predetermined bytes of the job information data that is sent from the rasterizing processor 22 (S82). The job information data in partial units is sent from the rasterizing processor 22 to the print processor 26 in S70 of FIG. 7. In the case of YES in S82, the process proceeds to S84.

In S84, the print processor 26 appends the time at which the job information data has been received in S82 (hereinafter referred to as "print data receiving time") to the job information data. The job information 38 as shown in FIG. 1 comes to include an association 40 of the print data receiving time 38f and the print data 38g. It should be noted that, in a case where NO is determined in a later-described step S96 of FIG. 9, the process of S82 will be repeated. Furthermore, in a case where the process of S82 is being performed on the same job information data for the second and subsequent time, the process of S84 will be skipped.

In a case where the process of S8 in FIG. 2 had been performed in the past, a cancel information is stored in the storage area 42. Thus, the print processor 26 determines whether cancel information is stored in the storage area 42 (S86). If NO is determined herein, the process proceeds to S94 of FIG. 9. On the other hand, in the case of YES herein, the print processor 26 further determines whether the cancel information designates to "cancel all the jobs" or "cancel the job printing" (S88). In the case of YES, the process proceeds to S90. On the other hand, in the case where the cancel information designates to "cancel the job printing", NO is determined in S88 and proceeds to S92.

In S90, the print processor 26 compares the print command receiving time included in the job information data that had been received in S82 and the cancel input time included in the cancel information. If the print command receiving time is earlier than the cancel input time, YES is determined in S90, and proceeds to S100 of FIG. 9. In contrast, if the print command receiving time is later than the cancel input time, NO is determined in S90, and proceeds to S94 of FIG. 9. On the other hand, in S92, the print processor 26 compares the print data receiving time appended to the job information data in S84 and the cancel input time included in the cancel information. If the print data receiving time is earlier than the cancel input time, YES is determined in S92, and the print processor 26 proceeds to S100 of FIG. 9. In contrast, if the print data receiving time is later than the cancel input time, NO is determined in S92, and proceeds to S94 of FIG. 9.

In S94 of FIG. 9, the print processor performs print process. The print process includes a process to have the print medium fed, a process to instruct the print portion 30 to print on the print medium in accordance with the print data included in the job information received in S82 of FIG. 8, a process to eject the printed medium and the like. Then, the print processor 26 determines whether all of the print data has been received in S82, and the printing thereof has been completed (S96). In the case of NO in this step, the print processor 26 returns to S82 and monitors the receipt of the subsequent bytes of job information data (that is, the print data). The print processor 26 is capable of performing printing of the entirety of the print data by repeating the receipt of predetermined bytes of print data (S82) and the printing of the received data (S94). When all of the print data has been printed, YES is determined in S96. In this case, the print processor 26 deletes all of the job information data received in S82 (S98). Then, the print processor 26 returns to S80, and monitors the receipt of the next task-start command.

In S100, the print processor 26 performs cancel process. The cancel process includes a process to instruct the print portion 30 to cease print, a process to have the print medium (to which printing had not been completed) ejected and the like. The printing in accordance with the print data received in S82 is thereby prohibited. After the completion of S100, the print processor 26 returns to S80, and monitors the receipt of the next task-start command.

(Download Process)

Figure 10:
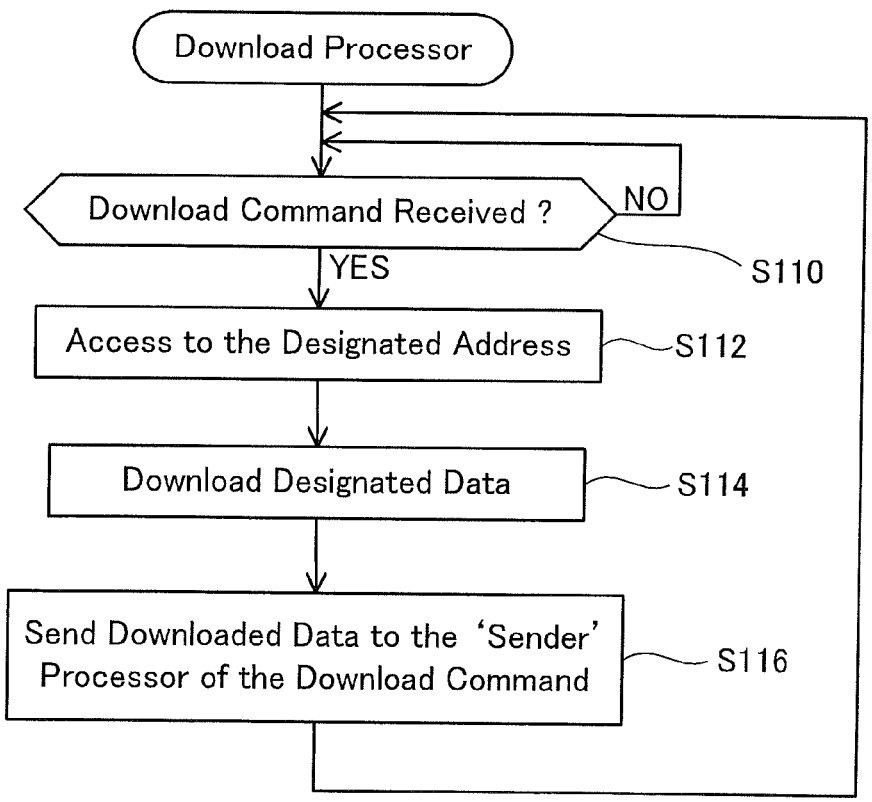
FIG. 10 is a flowchart of download process.

FIG. 10 is the flowchart of the download process. The download process is performed by the download processor 24 of the controller 16. The download processor 24 monitors receipt of download command from the respective processors 18, 20, 22 (S110). The download command as herein stated includes the instruction to download XHTML data (print data) given from the printing processor 18 in S14 of FIG. 3, the instruction to download style sheet file given from the layout processor 20 in the layout process (S50 of FIG. 6), the instruction to download image data given from the rasterizing processor 22 in the rasterizing process (S68 of FIG. 7), and the like. The download command includes the address to make access to, and the information to instruct make access to the designated address (hereinafter referred to as "access order"). For example, in the case of receiving the download command to download print data sent from the receiving processor 18 in S14 of FIG. 3 (YES at S110), the access order for the source URI 71 in FIG. 5 is sent to the download processor 24. As a result, the download processor 24 makes access to the IP address (i.e. "192.168.1.11") included in the source URI 71 (S112).

Then, the download processor 24 downloads the data designated by the address (S114). For example, in the case of the designation in the source URI 71, the XHTML data with the designated file name ("a045f2e1.xhtml") is downloaded via the port ("1025") designated in the source URI 71. The download processor 24 then sends the downloaded data to the 'sender' processor of the download command (S116). In the case with the source URI 71 being designated, the downloaded print data is sent to the receiving processor 18. After the aforementioned reply process is performed, the download processor 24 returns to the state (S110) of monitoring another download command.

In accordance with the aforementioned printer 10, the print command receiving time 38e (as well as the print data receiving time 38f) is stored in the printer 10 in accordance with the print command. The printer 10 is capable of referring to the print command receiving time 38e (or the print data receiving time 38f) and the cancel input time, and specifically cancel the printing that correspond to the print command receiving time 38e (or the print data receiving time 38f) that is earlier than the cancel input time. In other words, the printing that correspond to the print command receiving time 38e (or the print data receiving time 38f) that is later than the cancel input time is not erroneously cancelled. The printer 10 of the present embodiment is able to effectively prevent the occurrence of unintended cancellation of print. Furthermore, the printer 10 is capable of altering the object of cancellation in accordance with the types of the cancel command. That is, the printer 10 cancels the jobs that include the print command receiving time 38e earlier than the cancel input time when the cancel instruction from the user is to "cancel all the jobs", while on the other hand the printer 10 cancels the specific job that includes the print data receiving time 38f earlier than the cancel input time when the cancel instruction from the user is to "cancel the job printing." The cancellation in accordance with the user's intention can be efficiently carried out.

Although specific example according to the present invention has been detailed above, this is an example, and is not intended to limit the claims. The technologies described in the claims include various modifications and alternations. For example, though in the embodiment above, the association of the print data receiving time and the print data is created when the job information data (print data) is received by the print processor 26, association of print data receiving time and print data may be created when the job information data is received by the other processors (one of the layout processor and rasterizing processor in the above case). Furthermore, in the embodiment above, the job information data is sent from the receiving processor 18 to the layout processor 20, from the layout processor 20 to the rasterizing processor 22, from the rasterizing processor 22 to the print processor 26. The job information data transmitted among the respective processors 18, 20, 22, 26 includes the print data (XHTML data, layout data, image data, etc.). However, the respective processors 18, 20, 22, 26 may simply send only the job ID 38a of the job information data 38 (cf. FIG. 1). In this configuration, the processor that had received the job ID 38a may respectively retrieve the job information data that correspond thereto from the job information storage area 36. Such a configuration is also included in the term of the processor "sending job information" to another processor.

Furthermore, the printer may be configured to receive print data via a network adapter that is externally connected to the printer. In general, the externally-connected network adapters do not comprise any means that the user is able to operate to cancel printing. If information related to time is received with the print command, even in the case with the print data already received by the network adapter and of which the printer has not yet received, proper cancellation as intended by the user can be carried out. In such a case, based on the information related to time is received with the print command, the print data can be properly determined as a print data that is associated with a print command receiving time that is earlier than the cancel input time. The teachings disclosed herein can adequately perform cancellation of not only the print data accumulated in the printer, but also of the print data to which the print command had already been given to the printer (but that has not been received yet by the printer).

A part of technique disclosed in the above embodiments is described below. The printer may further comprise a first task performing device and a second task performing device. The first task performing device is configured to send the print data. Additionally, the first task performing device may be configured to perform print preparation process such as a layout process or rasterizing process. The second task performing device is configured to receive the print data sent from the first task performing device, create a new association of the print data and a print data receiving time at which the print data has been received, and perform a process to have the print data printed in a printing device. Specifically, the second task performing device may instruct the printing device to perform printing.

When the user of the printer gives out the order to cancel print, there may be a case in which the user desires to specifically cancel print of the print data that is currently being performed. Furthermore, there may also be a case in which the user desires to cancel print of a plurality of print data for which the print orders have already been given (i.e. for which the print commands have already been sent) to the printer. In order to meet with needs e.g. as above, the printer is preferably provided with the configuration in which the user is able to select the type of cancel command. Thus in the aforementioned printer, the cancel input device may be configured such that one of a plurality of cancel commands including a first cancel command and a second cancel command can be input.

In the above configuration, the invalidating device may invalidate:

(1) in a case where the first cancel command has been input to the cancel input device, printing of the print data associates with the print command receiving time that is earlier than the cancel input time at which the first cancel command has been input, and (2) in a case where the second cancel command has been input to the cancel input device, printing of the print data associated with the print data receiving time that is earlier than the cancel input time at which the second cancel command has been input.

In the case of (1), all the printing that correspond to the print commands that have been received by the printer at the time of inputting the cancel command can be cancelled. In the other hand case of (2), all the printing that correspond to the print data that have been received by the second task performing device at the time of inputting the cancel command (i.e. print data to which printing by the printing device has been put to execution) can be cancelled.

In the aforementioned printer, the first cancel command may be a command for cancellation of printing of every print data, and the second cancel command may be a command for cancellation of printing of the print data that is currently being printed in the printing device.

In the above printer, a receiving device may receive information related to a sender-side time together with the print command. For example, the print command may have information related to the time at which the print command had been created on the external apparatus side appended thereto. Alternately, the print command may have information related to the time at which the print command had been sent from the external apparatus appended thereto. In this case, the print command receiving time stored in a storage device may be a time that is determined in accordance with the received information related to the sender-side time.

The present printer may further comprise a time-adjusting device that adjusts the sender-side time received with the print command by using a time difference between the printer and an external apparatus that had sent the print command. In this case, the print command receiving time stored in the storage device may be the sender-side time that has been adjusted by the time-adjusting device.

There may be a case in which time difference occurs due to the difference in the setting of time in the external apparatus and the printer. In such a case, even when the cancel command is input to the printer after the print command had been sent from the external apparatus, the cancel input time may be on the record as being earlier than the print command receiving time; which may lead to undesirable situation in which printing of the print command that was intended to be cancelled is not invalidated. Hence, in the aforementioned printer, the sender-side time received with the print command may be corrected so as to compensate for the time difference between the 'sender' external apparatus and the printer. Further, by using the adjusted sender-side time as the print command receiving time, occurrence of situations in which print cancellation intended by the user is not correctly performed, and/or print cancellation not intended by the user being wrongly performed can be prevented.

The present printer may further comprise a information receiving device, a time detecting device and a time difference calculating device. The time information receiving device is configured to receive information related to a time. The "information related to a time" may be a data from which the time at which data has been sent from the external apparatus to the printer can be obtained. The "data" dispatched at the timing of the aforesaid time may include, but not limited to, the print command. The information related to the data-dispatch time as above may be received together with the print command. Alternately, the information related to the time as above may be received when an initial data transmission is performed between the external apparatus and the printer. The time detecting device is configured to detect a time at which the information related to the time has been received by the time information receiving device. The time difference calculating device is configured to calculate the time difference between the time included in the information received by the time information receiving device and the time detected by the time detecting device. Furthermore, with this configuration, the time-adjusting device may adjust the sender-side time received with the print command by using the time difference calculated by the time difference calculating device. For example, assuming that the data-dispatch time received by the data-dispatch time information receiving device is "10:01" while the data-receipt time detected by the data-receipt time detecting device is "10:06", a time difference of "plus five minutes" may be calculated by the time difference calculating device. In this case, if print command and sender-side time indicating "10:00" is received, the time-adjusting device may correct the sender-side time (10:00) by using the time difference (plus five minutes) to be adjusted to "10:05."

The printer taught in the present specification has a feature of storing the association of the print data and time information. In accordance therewith, the present teachings may provide a printer as below having such feature. In the aforementioned printer, the print data receiving time that correspond to the time at which the print data has been received by the second task performing device is stored (in the storage device). Hence, the invalidating device is capable of referring to the print data receiving time when the cancel input time is obtained (i.e. when the cancel command is input to the printer), and exclusively invalidate printing of print data with the print data receiving time earlier than the cancel input time. The aforementioned technique may be efficiently employed with printers that execute a plurality of tasks in parallel: e.g. receiving task of receiving print data, print preparation task of rasterizing and the like, in order to perform printing.

What is claimed is:

1. A printer comprising:
 a receiving device configured to receive a plurality of print commands;
 a storage device configured to store, for each of the plurality of commands, an association of print data corresponding to the print command[1] and a print command receiving time at which the print command has been received by the receiving device;
 a printing device configured to print the print data in accordance with each of the plurality of print commands;
 a cancel input device configured to input a cancel command;
 a detecting device configured to detect a cancel input time at which the cancel command has been input;
 a determining device configured to, for each of a plurality of associations stored in the storage device, compare the cancel input time detected by the detecting device to the respective print command receiving time included in the association and determine whether the print command receiving time included in the association is earlier than the cancel input time detected by the detecting device; and
 an invalidating device configured to invalidate printing of the print data associated with the print command receiving time that is earlier than the cancel input time.

2. The printer as in claim 1, further comprising:
 a first task performing device configured to send the print data; and a second task performing device configured to receive the print data sent from the first task performing device, create a new association of the print data and a print data receiving time at which the print data has been received, and perform a process to have the print data printed in the printing device,
wherein the cancel input device is configured such that one of a plurality of cancel commands including a first cancel command and a second cancel command can be input, and
the invalidating device invalidates:
(1) in a case where the first cancel command has been input to the cancel input device, printing of the print data associated with the print command receiving time that is earlier than the cancel input time at which the first cancel command has been input, and
(2) in a case where the second cancel command has been input to the cancel input device, printing of the print data associated with the print data receiving time that is earlier than the cancel input time at which the second cancel command has been input.

3. The printer as in claim 2, wherein
the first cancel command is a command for cancellation of printing of every print data, and
the second cancel command is a command for cancellation of printing of a print data that is currently being printed in the printing device.

4. The printer as in claim 3, wherein
the receiving device receives information related to a sender-side time together with the print command, and
the print command receiving time stored in the storage device is a time that is determined in accordance with the received information related to the sender-side time.

5. The printer as in claim 4, further comprising:
a time-adjusting device configured to adjust the sender-side time received with the print command by using a time difference between the printer and an external apparatus that had sent the print command,
wherein the print command receiving time stored in the storage device is the sender-side time that has been adjusted by the time-adjusting device.

6. The printer as in claim 5, further comprising:
a time information receiving device configured to receive information related to a time has been sent from the external apparatus;
a time detecting device configured to detect a time at which the information has been received by the time information receiving device; and
a time difference calculating device configured to calculate the time difference between the time included in the information received by the time information receiving device and the time detected by the data-receipt time detecting device,
wherein the time-adjusting device adjusts the sender-side time received with the print command by using the time difference calculated by the time difference calculating device.

7. The printer as in claim 3, wherein
in a case where the printing of the print data to be invalidated has been started in the printing device, the invalidating device invalidates further printing of the rest of the print data, and
in a case where the printing of the print data to be invalidated has not been started in the printing device, the invalidating device invalidates printing of the print data from being started.

8. The printer as in claim 2, wherein
the receiving device receives information related to a sender-side time together with the print command, and
the print command receiving time stored in the storage device is a time that is determined in accordance with the received information related to the sender-side time.

9. The printer as in claim 8, further comprising:
a time-adjusting device configured to adjust the sender-side time received with the print command by using a time difference between the printer and an external apparatus that had sent the print command,
wherein the print command receiving time stored in the storage device is the sender-side time that has been adjusted by the time-adjusting device.

10. The printer as in claim 9, further comprising:
a time information receiving device configured to receive information related to a time has been sent from the external apparatus;
a time detecting device configured to detect a time at which the information has been received by the time information receiving device; and
a time difference calculating device configured to calculate the time difference between the time included in the information received by the time information receiving device and the time detected by the data-receipt time detecting device,
wherein the time-adjusting device adjusts the sender-side time received with the print command by using the time difference calculated by the time difference calculating device.

11. The printer as in claim 2, wherein
in a case where the printing of the print data to be invalidated has been started in the printing device, the invalidating device invalidates further printing of the rest of the print data, and
in a case where the printing of the print data to be invalidated has not been started in the printing device, the invalidating device invalidates printing of the print data from being started.

12. The printer as in claim 1, wherein
the receiving device receives information related to a sender-side time together with the print command, and
the print command receiving time stored in the storage device is a time that is determined in accordance with the received information related to the sender-side time.

13. The printer as in claim 12, further comprising:
a time-adjusting device configured to adjust the sender-side time received with the print command by using a time difference between the printer and an external apparatus that had sent the print command,
wherein the print command receiving time stored in the storage device is the sender-side time that has been adjusted by the time-adjusting device.

14. The printer as in claim 13, further comprising:
a time information receiving device configured to receive information related to a time has been sent from the external apparatus;
a time detecting device configured to detect a time at which the information has been received by the time information receiving device; and
a time difference calculating device configured to calculate the time difference between the time included in the information received by the time information receiving device and the time detected by the data-receipt time detecting device, wherein the time-adjusting device adjusts the sender-side time received with the print command by using the time difference calculated by the time difference calculating device.

15. The printer as in claim 1, wherein
in a case where the printing of the print data to be invalidated has been started in the printing device, the invalidating device invalidates further printing of the rest of the print data, and
in a case where the printing of the print data to be invalidated has not been started in the printing device, the invalidating device invalidates printing of the print data from being started.

16. A printer comprising:
a printing device configured to print print data;
a first task performing device configured to create a plurality of print data in accordance with a plurality of print commands by performing rasterizing and send each of the plurality of print data;
a second task performing device configured to receive the each of the plurality of print data sent from the first task performing device, create, for each of the plurality of print data, an association of the print data and a print data receiving time at which the print data has been received by the second task performing device, and perform a process to have the print data printed in the printing device;
a storage device configured to store a plurality of associations created by the second task performing device;
a cancel input device configured to input a cancel command;
a detecting device configured to detect a cancel input time at which the cancel command has been input;
a determining device configured to, for each of a plurality of associations stored in the storage device, compare the cancel input time detected by the detecting device to the respective print data receiving time included in the association and determine whether the print data receiving time included in the association is earlier than the cancel input time detected by the detecting device; and
an invalidating device configured to invalidate printing of the print data associated with the print data receiving time that is earlier than the cancel input time.

17. A printer comprising:
a receiving device configured to receive a print command and information related to a sender-side time;
a time-adjusting device configured to adjust the sender-side time received with the print command by using a time difference between the printer and an external apparatus that had sent the print command;
a storage device configured to store an association of print data and a print command receiving time at which the print command has been received by the receiving device;
a printing device configured to print the print data;
a cancel input device configured to input a cancel command; and
an invalidating device configured to invalidate printing of the print data associated with the print command receiving time that is earlier than a cancel input time at which the cancel command has been input,
wherein the print command receiving time stored in the storage device is the sender-side time that has been adjusted by the time-adjusting device.

18. The printer as in claim 1, wherein
the storage device stores the cancel input time,
the determining device determines whether the print command receiving time is earlier than the cancel input time for each of a plurality of associations stored in the storage device, and
the invalidating device invalidates the printing after a predetermined time has elapsed since the cancel input time.

19. The printer as in claim 16, wherein
the storage device stores the cancel input time,
the determining device determines whether the print command receiving time is earlier than the cancel input time for each of a plurality of associations stored in the storage device, and
the invalidating device invalidates the printing after a predetermined time has elapsed since the cancel input time.

20. A printer, comprising:
a receiving device configured to receive a plurality of print commands;
a storage device configured to store, for each of the plurality of commands, an association of print data corresponding to the print command and a print command receiving time at which the print command has been received by the receiving device;
a printing device configured to print the print data in accordance with each of the plurality of print commands;
a cancel input device configured to input a cancel command;
a detecting device configured to detect a cancel input time at which the cancel command has been input;
a determining device configured to determine, for each of a plurality of associations stored in the storage device, whether the print command receiving time included in the association is earlier than the cancel input time detected by the detecting device; and
an invalidating device configured to invalidate printing of any of the print data associated with the print command receiving time that is earlier than the cancel input time.

21. A printer, comprising:
a printing device configured to print print data;
a first task performing device configured to create a plurality of print data in accordance with a plurality of print commands by performing rasterizing and send each of the plurality of print data;
a second task performing device configured to receive the each of the plurality of print data sent from the first task performing device, create, for each of the plurality of print data, an association of the print data and a print data receiving time at which the print data has been received by the second task performing device, and perform a process to have the print data printed in a printing device;
a storage device configured to store a plurality of associations created by the second task performing device;
a cancel input device configured to input a cancel command;
a detecting device configured to detect a cancel input time at which the cancel command has been input;
a determining device configured to determine, for each of a plurality of associations stored in the storage device, whether the print data receiving time included in the association is earlier than the cancel input time detected by the detecting device; and
an invalidating device configured to invalidate printing of any of the print data associated with the print data receiving time that is earlier than the cancel input time.

* * * * *